Oct. 13, 1953    C. V. GARY ET AL    2,655,124
LIQUID INDICATOR DEVICE
Filed Oct. 25, 1950
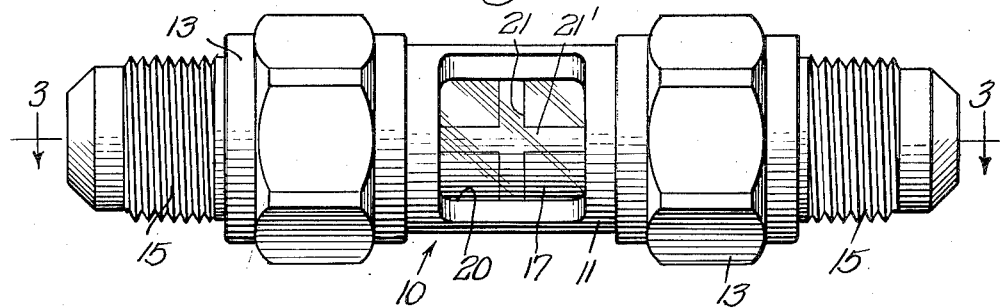
Fig. 1
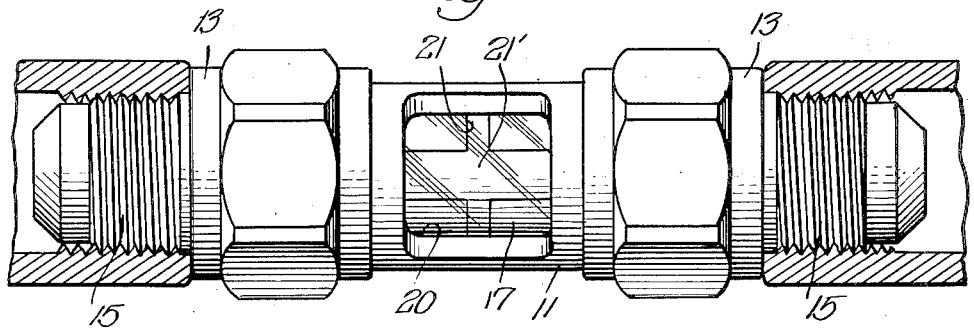
Fig. 2
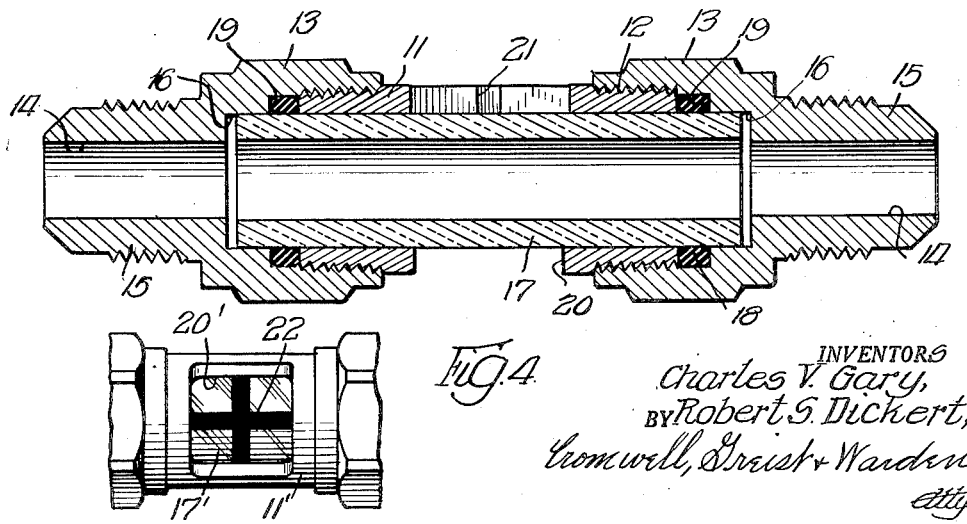
Fig. 3
Fig. 4
INVENTORS
Charles V. Gary,
BY Robert S. Dickert,
Cromwell, Greist & Warden
ATTYS.

Patented Oct. 13, 1953

2,655,124

UNITED STATES PATENT OFFICE 2,655,124

LIQUID INDICATOR DEVICE

Charles V. Gary, Elmhurst, and Robert S. Dickert, Chicago, Ill., assignors to Henry Valve Company, Incorporated, Melrose Park, Ill., a corporation of Illinois Application October 25, 1950, Serial No. 191,992

1 Claim. (Cl. 116—117)

The present invention pertains to a simple, improved and highly effective device to indicate the presence or absence of liquid in a liquid handling line or system.

Various indicators of the general sort referred to above are known. These include transparent liquid level columns showing the height of a column of liquid therein as an indication of the level of a body of liquid in a vessel with which the tube communicates. In order to improve the effectiveness of such sight tubes, it has also been proposed to mark a vertical stripe along the side of the tube opposite that exposed to the viewer, with the effect of causing the stripe to appear wider beneath the level of the liquid than above. Such installations of liquid level sight tubes are limited to those in which the tube is disposed vertically. They are liquid level or height indicators, exclusively, having no utility for an installation in which the tube is disposed horizontally.

In applications involving a liquid line or connector, for viewing the presence of liquid in motion as in refrigerant lines, it has been proposed to employ a special fitting adapted to be connected in said line and having a pair of aligned side openings through which a transparent inner tube in the fitting is exposed. This tube is in some cases provided with a round spot on the side thereof opposite the viewer, with the intention that the spot will appear differently to the viewer, more elongated perpendicular to the length of the tube when the latter is filled than when unfilled. This is because of the curvature of the tube and its resultant transverse lens action when filled with a transparent liquid. However, it has been found that this expedient is not entirely satisfactory, in that an attendant viewing the spot through the transparent liquid usually finds it difficult to distinguish whether the oval appearance is due to the present or shortage of liquid.

It is therefore an object of the invention to provide a liquid indicating device, suitable for use in liquid handling lines which are located horizontally as well as vertically, which will enable an attendant to ascertain much more quickly and reliably than is possible at present whether or not a liquid is present in the line.

A further and more specific object of the invention is to provide such a liquid indicator device, of the type relying in operation upon the distortive effect of a liquid in its transparent cylindrical tube upon a mark associated with said tube, in which the mark is characterized by two transversely extending portions, one subject in a materially greater degree to the distortive action referred to above than the other, thereby enabling an attendant to determine with ease and speed the presence or absence of liquid in the tube by a comparison of the relative width of the two portions of the mark.

A still further and more specific object is to provide a device of the foregoing character wherein the mark is in the form of a cross or like character having two intersecting arms, one paralleling and one transverse the length of the tube, that paralleling the tube length being slightly wider than the transverse arm, whereby said arms appear to differ widely in width when the cylindrical tube is filled with liquid, the arm which extends longitudinally of or parallels the tube being very substantially wider in appearance than the transversely extending arm, and whereby the arms are of the same apparent width when viewed through an empty tube.

Yet another object is to provide a liquid indicator having a special indicator mark associated therewith for the purpose referred to above, in which the mark is permanently built into the indicator structure by punching, milling or otherwise shaping the external body thereof to provide a permanent, ineradicable and undefaceable sight-mark which is particularly well suited to the contemplated purpose.

A further object is to provide an indicator as set forth in the preceding paragraph which has its indicator mark disposed on a single part of the device, thereby greatly facilitating assembly of the component parts of the structure to their final form.

The foregoing statements are indicative in a general way of the nature of the invention. Other and more specific objects will be apparent to those skilled in the art upon a full understanding of the construction and operation of the device.

Two embodiments of the invention are presented herein for purpose of illustration and it will be appreciated that the invention may be incorporated in other modified forms coming equally within the scope of the appended claim.

In the drawings:

Fig. 1 is a view in side elevation of the subject indicator device, showing the same as an unconnected fitting;

Fig. 2 is a fragmentary view similar to Fig. 1, showing the device coupled with a horizontal liquid handling line, and indicating the distinctive distorted appearance of the indicator mark when the device and the line with which it is coupled are filled with liquid;

Fig. 3 is a view in longitudinal section on a line corresponding to line 3—3 of Fig. 1, illustrating structural details of the indicator; and Fig. 4 is a fragmentary view illustrating an alternative embodiment.

The indicator device 10 comprises, in general, a central, rigid metallic, tubular body, housing or sleeve 11 of hollow cylindrical cross section which has like threads 12 at its opposite ends, as shown in Fig. 3, receiving a pair of connecting fittings 13. These are similar in character, being provided with axial bores 14 through the externally threaded coupling nipples 15 thereof. Bores 14 open inwardly into internal counterbores 16 these counterbores being of diameter corresponding to the internal diameter of the metal body 11.

A transparent glass or plastic indicator or sight tube 17, open at its opposite ends, is disposed in the body or housing 11 and the fitting counterbores 16, a pair of annular, compressible O-rings 18 encircling the tube adjacent opposite ends thereof to center the same radially in the counterbores. These O-rings are axially compressed between the ends of body 11 and a pair of opposed counterbore abutment shoulders 19 when the end fittings 13 are taken up on sleeve threads 12. Thus leakage from the indicator tube 17 is prevented.

The indicator body or housing 11 is punched, milled or otherwise recessed on one side and centrally of the ends thereof to provide a window 20 through which the transparent tube 17 is exposed to view. The opposite side of the body is punched or milled in lateral alignment with the window to provide a cross-shaped mark-defining aperture 21. This aperture has intersecting horizontal and vertical arms at right angles to one another which are of equal length, the arm extending vertically, or transverse the length of the tube, is actually slightly narrower than the arm paralleling the tube. The aperture is located on the side of the installation opposite the attendant so that the cruciform mark 21' outlined thereby is viewed through the tube 17 and its contents.

When the indicating device is coupled to an empty fluid handling line, the mark 21' is approximately uniform or symmetric in appearance from all angles as regards the width of its two intersecting, right angle arms. The relation is as shown in Fig. 1. Inasmuch as the transparent tube 17 causes some slight distortion even when unfilled, due to a lens action on light rays traversing the tube, this is very slight indeed and is compensated for as mentioned above, by the slight difference in actual width of the two arms, to the end that they appear equal in width when viewed through the empty tube 17.

When the tube is full of liquid, the distortive effect is pronounced. The mark 21' has the appearance shown in Fig. 2 of the drawings when viewed through the tube, the longitudinal or horizontal arm thereof being apparently magnified substantially in transverse width as compared with the transverse or vertical arm. Thus an attendant viewing the device cannot fail to recognize immediately, by an instantaneous comparison of the width of the two arms, that the device is full of liquid. He is trained in advance to know that when the width of the two arms appears equal the liquid line is empty or low in volume.

The described procedure of outlining the sight mark by aperturing the body 11 has the advantage of permanence, in that the mark cannot be defaced or rubbed out, and ruggedness. However the invention is not limited to this expedient. As embodied in the alternative form shown in Fig. 4 a mark 22 may be applied to the rear side of the tube 11' by painting and firing on by etching or otherwise, this mark being in transverse alignment with the window 20'. The distortive effect on the appearance of the mark when the tube is full of liquid is the same as described above.

It is evident that it is most practical and expedient to place the mark 21' or 22 on the wall of the body 11 (Figs. 1–3) or tube 17' (Fig. 4) opposite the window 20 or 20'. However, the same general effect is obtained so long as the mark is spaced to the rear of the window even though not directly on the body or tube.

What is claimed is:

A liquid indicator device comprising a tubular metal housing having a lateral viewing window formed in a wall thereof, and a transparent tube in said housing exposed transversely of the tube axis at said window, said housing having a cruciform opening formed through a wall thereof which is spaced transversely of the tube axis from said window, which opening is viewable through said window and tube, said opening having distinct intersecting arm portions of substantially equal thickness extending at a 90° angle to one another and disposed parallel to and transversely of the tube axis, respectively, which portions are relatively distorted in appearance when viewed through said window and a liquid in the tube.

CHARLES V. GARY.
ROBERT S. DICKERT.

References Cited in the file of this patent

UNITED STATES PATENTS

| Number | Name | Date |
|---|---|---|
| 485,451 | Carleton | Nov. 1, 1892 |
| 538,989 | Wells | May 7, 1895 |
| 781,042 | Wood | Jan. 31, 1905 |
| 992,612 | Stanton | May 16, 1911 |
| 1,159,764 | Heller | Nov. 9, 1915 |
| 1,225,604 | Ernst | May 8, 1917 |